3,049,573
ISOMERIZATION OF DICHLOROBUTENES
Richard F. Stahl, Madison, and Cyril Woolf, Morristown, N.J., assignors to Allied Chemical Corporation, New York, N.Y., a corporation of New York
No Drawing. Filed May 4, 1960, Ser. No. 26,710
8 Claims. (Cl. 260—654)

This invention relates to production of either of the isomeric dichlorobutenes, 1,4-dichlorobutene-2 and 3,4-dichlorobutene-1, by allylic rearrangement.

1,4-dichlorobutene-2 and 3,4-dichlorobutene-1 are generally formed when dichlorobutenes are produced by chlorination of butadiene. There is considerable interest in 3,4-dichlorobutene-1 as an intermediate in the production of chloroprene. Chloroprene is a raw material used in the manufacture of synthetic rubber. Moreover, 1,4-dichlorobutene-2 finds utility as an intermediate for the preparation of adipic acid, butenediol and other valuable products.

The allylic rearrangement of 1,4-dichlorobutene-2 and 3,4-dichlorobutene-1 may be represented by the following equation:

$$CH_2Cl—CH=CH—CH_2Cl \rightleftarrows CH_2=CH—CHCl—CH_2Cl$$

According to U.S.P. 2,242,084, 3,4-dichlorobutene-1 may be transposed into 1,4-dichlorobutene-2 at temperature below 50° C. in the presence of a metallic halide condensing agent such as $ZnCl_2$, $FeCl_3$, $TiCl_4$ or $AlCl_3$. However, this procedure suffers from the disadvantage of low yields due to excessive dehydrochlorination and degradative side reactions.

It has been suggested in U.S.P. 2,422,252 that transposition of dichlorobutenes may be carried out in the absence of catalysts by heating at temperature of at least about 120° C. However, rearrangement proceeds very slowly in the absence of catalysts, and the prolonged heating necessary to attain useful conversion of one isomer into the other still results in excessive dehydrochlorination and undesired side reactions.

It is the object of the present invention to provide an improved process for transposing either of the dichlorobutenes, 1,4-dichlorobutene-2 or 3,4-dichlorobutene-1, to the other isomer to give high yields of transposed dichlorobutene with minimum formation of by-products. Other objects and advantages of the invention will appear in the following description and example.

In accordance with the present invention, it has been found that certain aluminum fluoride catalysts have the property of catalyzing the allylic rearrangement of 1,4-dichlorobutene-2 and 3,4-dichlorobutene-1 so as to effect formation of high yields of the desired isomer with minimum formation of by-products.

Different types of aluminum fluorides are known. Generally such materials consist of lumps or smaller discrete particles which in turn are composed of $AlF_3$ crystals of relatively large size, i.e. not less than one thousand and usually several thousand Angstrom units radius and above, as in the case of aluminum fluorides commercially available on the market. However, certain forms of $AlF_3$, when examined even by the highest powered optical microscope, appear to be of non-crystalline or "amorphous" structure. When such "amorphous" aluminum fluorides are examined using X-ray diffraction technique, extremely small, sub-microscopic crystals, "crystallites," may be detected. In practice of this invention, such "amorphous" aluminum fluorides, having crystals of certain sub-microscopic (crystallite) size, are used to effect the allylic rearrangement of 1,4-dichlorobutene-2 and 3,4-dichlorobutene-1. The desired catalytic activity prevails in aluminum fluorides of crystallite size of about 500 Angstrom units radius or below. As crystallite size decreases below this value, desired catalytic activity increases, and particularly suitable aluminum fluorides include those having crystallite size of about 200 Angstrom units radius and below. Aluminum fluoride catalysts of this type are more fully described in U.S.P. 2,673,139 of March 23, 1954, which discloses processes for making the same by procedures involving reaction of aluminum chloride and HF.

1,4-dichlorobutene-2 and 3,4-dichlorobutene-1 may be transposed to the other isomer by contacting the dichlorobutene which it is desired to convert into its isomer with an aluminum fluoride catalyst of the type described above at temperature of at least about 120° C. until the boiling point of the reaction mixture has been substantially changed and then separating the resulting mixture of dichlorobutenes. The transposition of the dichlorobutene may be carried out by heating the material in liquid phase under reflux conditions or by passing the dichlorobutene in vapor form through a tube maintained at the temperature indicated or by other means known in the art, batchwise or continuous.

Generally speaking, the aluminum fluoride catalyst is employed in amount ranging from about 0.01% to about 10% by weight of the dichlorobutene starting material. Particularly advantageous results have been obtained using about 0.02 to 1% of catalyst by weight of starting material.

Although reaction may be carried out either at atmospheric pressure or at lower or higher pressures, atmospheric pressure is generally employed for the sake of convenience. At atmospheric pressure, maximum temperature possible in the liquid phase is about 150° C., the normal boiling point of 1,4-dichlorobutene-2. Reaction is possible in the liquid phase at sufficient superatmospheric pressure to maintain the liquid phase at temperature up to about 200° C.

In the preferred embodiment of this invention, one of the dichlorobutenes, 1,4-dichlorobutene-2 or 3,4-dichlorobutene-1, is charged with the aluminum fluoride catalyst to a reaction zone and heated in liquid phase under refluxing conditions. Reflux distillation is carried out until substantial conversion has been effected, preferably until equilibrium is reached. The refluxed material is then fractionally distilled to separate the two isomers. Unconverted starting material recovered during the distillation may be recycled for further treatment to convert it to its isomer.

When 3,4-dichlorobutene-1 (boiling point—about 120° C.) is to be prepared from the higher boiling 1,4-dichlorobutene-2, liquid 1,4-dichlorobutene-2 or a mixture containing it is contacted with the aluminum fluoride catalyst. The liquid system is then heated to boiling in a still connected with a fractionating column, and the liquid system is allowed to reflux until susbtantial conversion has been effected. The desired 3,4-dichlorobutene-1 is removed as overhead at temperature of about 120° C. from the fractionating device at the rate at which it is formed.

When 1,4-dichlorobutene-2 is the desired product, liquid 3,4-dichlorobutene-1 or a mixture containing it is refluxed in the presence of the aluminum fluoride catalyst until substantial conversion has been effected. The aluminum fluoride catalyst is then removed by decantation and/or filtration, and the product is fractionally distilled, preferably in vacuum, to recover the desired 1,4-dichlorobutene-2.

The liquid phase operation may be carried out continuously by feeding the dichlorobutene starting material to the reaction zone containing the aluminum fluoride catalyst in suspended form and continuously withdrawing product from the reaction zone. In another modification, the starting material may be percolated continuously down a tower packed with the aluminum fluoride catalyst, and product may be continuously withdrawn from the base of the tower.

The rate and extent of the liquid phase reaction may be increased by raising the temperature and/or by increasing the amount of aluminum fluoride catalyst present. The reaction temperature prevailing at atmospheric pressure may be increased by use of an inert high boiling diluent such as $CCl_3CClFCCl_3$ (boiling point—238° C.), $CCl_3CF_2CCl_2CClF_2$ (boiling point—209° C.) and $$(CCl_2FCClF-)_2$$

(boiling point—207° C.)

When the reaction is carried out by passing the dichlorobutene starting material in vapor form through a heated tube, the desired vaporization of the liquid dichlorobutene may be brought about by passing an inert carrier gas, such as nitrogen, through the boiling liquid and thereafter passing the nitrogen-dichlorobutene vapor mixture through a heated tube which serves as reaction zone, for example, a glass tube heated to desired temperature. When this procedure is used, the temperature is generally maintained in the range of about 150° to 400° C. The exit gases from the heated tube are led through a condenser to liquefy the dichlorobutene mixture which is then separated by fractional distillation.

The following example, in which parts are by weight, is illustrative of the process of this invention. Since the conversion of 1,4-dichlorobutene-2 to 3,4-dichlorobutene-1 is at present considered to be of greater potential importance, the example deals with such conversion. It should be understood, however, that essentially the same conditions apply for the reverse reaction.

*Example*

297 parts of 1,4-dichlorobutene-2 and 0.5 part of aluminum fluoride catalyst composed of crystallites of size below about 500 Angstrom units radius were placed in a still and subjected to reflux distillation. Heat was supplied by a mantle surrounding the still, and the liquid refluxed through a column equipped with a water-cooled distilling head. Reflux started at 150° C., the normal boiling point of 1,4-dichlorobutene-2, and as refluxing continued, the head temperature dropped to 120° C., the normal boiling point of 3,4-dichlorobutene-1. The 3,4-dichlorobutene-1 was continuously withdrawn, maintaining the head temperature at 120° C. After one hour, the reaction was terminated and the products were redistilled. The results of the distillation were as follows:

| | Percent by weight |
|---|---|
| Low boilers | 3.1 |
| 3,4-dichlorobutene-1 | 44.9 |
| 1,4-dichlorobutene-2 | 51.4 |
| Residue | 0.6 |

The 3,4-dichlorobutene-1 and 1,4-dichlorobutene-2 were identified by boiling point and infrared analyses. Conversion of 1,4-dichlorobutene-2 to 3,4-dichlorobutene-1 of 44.9% by weight was obtained with a 3,4-dichlorobutene-1 yield of 93% by weight.

Since certain changes may be made in carrying out the above process without departing from the scope of the invention, it is intended that all matter contained in the above description shall be interpreted as being illustrative and not in a limiting sense.

We claim:
1. The process for converting one of the dichlorobutenes, 1,4-dichlorobutene-2 and 3,4-dichlorobutene-1, to the other isomer which comprises heating said dichlorobutene in the presence of a susbtantially anhydrous aluminum fluoride catalyst, said catalyst having crystallite size not substantially greater than about 500 Angstrom units radius and having been derived by reaction of $AlCl_3$ and HF, at temperature of at least about 120° C. until the boiling point of the mixture has been substantially changed and separating the resulting mixture of dichlorobutenes.

2. The process for converting one of the dichlorobutenes, 1,4-dichlorobutene-2 and 3,4-dichlorobutene-1, to the other isomer which comprises heating said dichlorobutene in the presence of a substantially anhydrous aluminum fluoride catalyst, said catalyst having crystallite size not substantially greater than about 500 Anstrom units radius and having been derived by reaction of $AlCl_3$ and HF, at temperature of at least about 120° until the boiling point of the mixture has been substantially changed and separating the resulting mixture of dichlorobutenes by fractional distillation.

3. The process for converting 1,4-dichlorobutene-2 to 3,4-dichlorobutene-1 which comprises heating the 1,4-dichlorobutene-2 in the presence of a substantially anhydrous aluminum fluoride catalyst, said catalyst having crystallite size not substantially greater than about 500 Angstrom units radius and having been derived by reaction of $AlCl_3$ and HF, at temperature of at least about 120° until the boiling point of the mixture has been substantially changed and separating 3,4-dichlorobutene-1 from the reaction mixture.

4. The process for converting 3,4-dichlorobutene-1 to 1,4-dichlorobutene-2 which comprises heating the 3,4-dichlorobutene-1 in the presence of a substantially anhydrous aluminum fluoride catalyst, said catalyst having crystallite size not substantially greater than about 500 Angstrom units radius and having been derived by reaction of $AlCl_3$ and HF, at temperature of at least about 120° until the boiling point of the mixture has been substantially changed and separating 1,4-dichlorobutene-2 from the reaction mixture.

5. The process for converting 1,4-dichlorobutene-2 to 3,4-dichlorobutene-1 which comprises heating the 1,4-dichlorobutene-2 in the presence of a substantially anhydrous aluminum fluoride catalyst, said catalyst having crystallite size not substantially greater than about 500 Angstrom units radius and having been derived by reaction of $AlCl_3$ and HF, at temperature of at least about 120° until the boiling point of the mixture has been substantially changed and separating 3,4-dichlorobutene-1 from the reaction mixture by fractional distillation.

6. The process for converting 3,4-dichlorobutene-1 to 1,4-dichlorobutene-2 which comprises heating the 3,4-dichlorobutene-1 in the presence of a substantially anhydrous aluminum fluoride catalyst, said catalyst having crystallite size not substantially greater than about 500 Angstrom units radius and having been derived by reaction of $AlCl_3$ and HF, at temperature of at least about 120° until the boiling point of the mixture has been substantially changed and separating 1,4-dichlorobutene-2 from the reaction mixture by fractional distillation.

7. The process of converting 1,4-dichlorobutene-2 to 3,4-dichlorobutene-1 which comprises heating the 1,4-dichlorobutene-2 in liquid phase in the presence of a substantially anhydrous aluminum fluoride catalyst, said catalyst having crystallite size not substantially greater than about 500 Angstrom units radius and having been derived by reaction of $AlCl_3$ and HF, at temperature of about 120° to about 200° C. until the boiling point of the mixture has been substantially changed and separating 3,4-dichlorobutene-1 from the reaction mixture by fractional distillation.

8. The process for converting 3,4-dichlorobutene-1 to 1,4-dichlorobutene-2 which comprises heating the 3,4-dichlorobutene-1 in liquid phase in the presence of a substantially anhydrous aluminum fluoride catalyst, said catalyst having crystallite size not substantially greater than about 500 Angstrom units radius and having been derived by reaction of $AlCl_3$ and HF, at temperature of about 120° to about 200° C. until the boiling point of the mixture has been substantially changed and separating 1,4-dichlorobutene-2 from the reaction mixture by fractional distillation.

References Cited in the file of this patent
UNITED STATES PATENTS

| | | |
|---|---|---|
| 2,242,084 | Nicodemus | May 13, 1941 |
| 2,388,942 | Zimmerman | Nov. 13, 1945 |